(12) United States Patent
Liu

(10) Patent No.: US 11,800,385 B2
(45) Date of Patent: Oct. 24, 2023

(54) DATA SENDING CONTROL METHOD FOR TERMINAL, TERMINAL DEVICE, AND COMPUTER STORAGE MEDIUM

(71) Applicant: GUANGDONG OPPO MOBILE TELECOMMUNICATIONS CORP., LTD., Guangdong (CN)

(72) Inventor: Jianhua Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/018,643

(22) Filed: Sep. 11, 2020

(65) Prior Publication Data
US 2020/0413274 A1 Dec. 31, 2020

Related U.S. Application Data

(63) Continuation of application No. PCT/CN2018/071968, filed on Jan. 9, 2018.

(51) Int. Cl.
*H04W 24/08* (2009.01)
*H04W 52/24* (2009.01)

(52) U.S. Cl.
CPC ......... *H04W 24/08* (2013.01); *H04W 52/241* (2013.01)

(58) Field of Classification Search
CPC .. H04W 24/08; H04W 52/241; H04W 52/146
See application file for complete search history.

(56) References Cited

U.S. PATENT DOCUMENTS

| 10,903,889 | B2 * | 1/2021 | Nilsson | H04L 25/0204 |
| 2004/0190486 | A1 | 9/2004 | Oshiba | |
| 2010/0056197 | A1 | 3/2010 | Attar et al. | |
| 2012/0106386 | A1 * | 5/2012 | Johansson | H04W 24/10 370/252 |
| 2012/0135728 | A1 * | 5/2012 | Karpoor | H04W 48/16 455/432.1 |
| 2012/0135777 | A1 * | 5/2012 | Karpoor | H04W 52/146 455/67.11 |
| 2012/0262336 | A1 | 10/2012 | Yamamoto | |
| 2012/0309445 | A1 * | 12/2012 | Tsui | H04B 17/327 455/522 |

(Continued)

FOREIGN PATENT DOCUMENTS

| CN | 101123622 A | 2/2008 |
| CN | 101646077 A | 2/2010 |

(Continued)

OTHER PUBLICATIONS

International Search Report in the international application No. PCT/CN2018/071968, dated Sep. 25, 2018.

(Continued)

*Primary Examiner* — Hassan Kizou
*Assistant Examiner* — Hector Reyes
(74) *Attorney, Agent, or Firm* — PERKINS COIE LLP

(57) ABSTRACT

Disclosed are a method for controlling data transmission of a terminal device, a terminal device, and a computer storage medium. The method includes: acquiring link quality of a link over which data is to be transmitted; and determining, according to the link quality of the link over which the data is to be transmitted, whether to transmit the data.

16 Claims, 14 Drawing Sheets

(56) References Cited

U.S. PATENT DOCUMENTS

| | | | | |
|---|---|---|---|---|
| 2013/0012189 | A1* | 1/2013 | Hamabe | H04W 36/30 455/422.1 |
| 2014/0321389 | A1* | 10/2014 | Zhang | H04W 52/346 370/329 |
| 2015/0230234 | A1* | 8/2015 | Choi | H04W 72/0446 370/329 |
| 2017/0195974 | A1 | 7/2017 | Huang | |
| 2018/0139702 | A1* | 5/2018 | Ramkumar | H04W 52/34 |
| 2018/0376484 | A1* | 12/2018 | Beale | H04W 72/10 |
| 2020/0413274 | A1* | 12/2020 | Liu | H04W 52/241 |

FOREIGN PATENT DOCUMENTS

| | | |
|---|---|---|
| CN | 101827419 A | 9/2010 |
| CN | 102104913 A | 6/2011 |
| CN | 102316572 A | 1/2012 |
| CN | 102325362 A | 1/2012 |
| CN | 104244349 A | 12/2014 |
| CN | 104521274 A | 4/2015 |
| CN | 105557016 A | 5/2016 |
| CN | 105933970 A | 9/2016 |
| CN | 106211335 A | 12/2016 |
| CN | 107466062 A | 12/2017 |
| EP | 1463230 A2 | 9/2004 |
| WO | 2016188434 A1 | 12/2016 |

OTHER PUBLICATIONS

English translation of the Written Opinion of the International Search Authority in the international application No. PCT/CN2018/071968, dated Sep. 25, 2018.
First Office Action of the Chinese application No. 201880002978.8, dated Dec. 5, 2019.
Second Office Action of the Chinese application No. 201880002978.8, dated Mar. 18, 2020.
First Office Action of the Chinese application No. 202010932452.9, dated Mar. 29, 2022. 18 pages with English translation.
Third Office Action of the Chinese application No. 202010932452.9, dated Nov. 30, 2022. 13 pages with English translation.
Decision of Rejection of the Chinese application No. 202010932452.9, dated Mar. 3, 2023. 11 pages with English translation.

* cited by examiner

DATA SENDING CONTROL METHOD FOR TERMINAL, TERMINAL DEVICE, AND COMPUTER STORAGE MEDIUM

CROSS-REFERENCE TO RELATED APPLICATION

This is a continuation application of International Patent Application No. PCT/CN2018/071968, filed on Jan. 9, 2018, the content of which is incorporated by reference herein in its entirety for all purposes.

TECHNICAL FIELD

The disclosure relates to the technical field of information processing, and in particular to, a method for controlling data transmission of a terminal device, a terminal device, and a computer storage medium.

BACKGROUND

In an existing system, in data transmission, a terminal may control an uplink transmitting power based on an uplink power control technology. That is to say, data transmission may be performed with a low power when a link quality is good, and data transmission may be performed with a high power when the link quality is poor.

However, such a processing method may cause serious power consumption of the terminal.

SUMMARY

In order to solve the above problem, a method for controlling data transmission of a terminal device, a terminal device, and a computer storage medium are provided in embodiments of the disclosure.

In embodiments of the disclosure, provided is a method for controlling data transmission of a terminal device, applied to the terminal device, and including: acquiring link quality of a link over which data is to be transmitted; and determining, according to the link quality of the link over which the data is to be transmitted, whether to transmit the data.

In embodiments of the disclosure, provided is a terminal device, including: a quality acquisition unit, configured to acquire link quality of a link over which data is to be transmitted; and a transmission control unit, configured to determine, according to the link quality of the link over which the data is to be transmitted, whether to transmit the data.

In embodiments of the disclosure, provided is a terminal device, including: a processor, and a memory for storing a computer program that can be run on the processor, wherein the processor, when running the computer program, performs the actions of the method above.

In embodiments of the disclosure, provided is a computer storage medium with computer-executable instructions stored thereon, wherein the computer-executable instructions, when executed, implement the actions of the method above.

DETAILED DESCRIPTION

In order to provide more detailed understanding of the features and technical aspects of the embodiments of the disclosure, the implementation of the embodiments of the disclosure will be described in detail below with reference to the accompanying drawings, and the accompanying drawings are for illustrative purposes only and are not intended to limit the embodiments of the disclosure.

Embodiment 1

Figure 1:
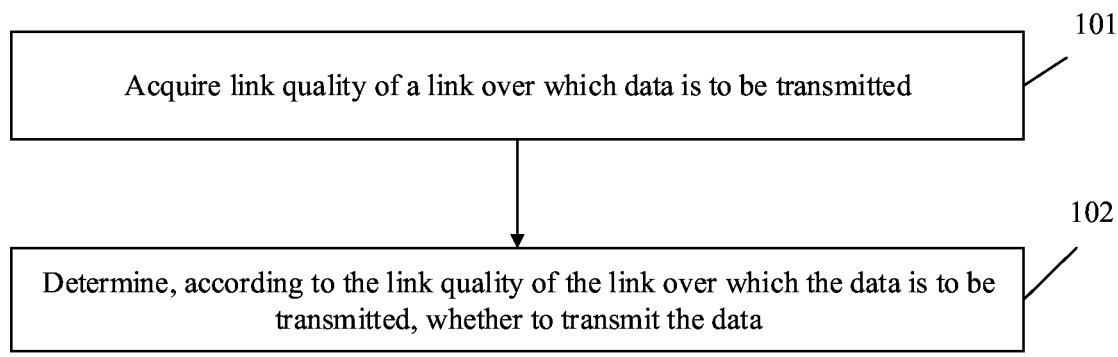
FIG. 1 illustrates a schematic flowchart of a method for controlling data transmission of a terminal device according to an embodiment of the disclosure.

In embodiments of the disclosure, provided is a method for controlling data transmission of a terminal device. As illustrated in FIG. 1, the method is applied to the terminal device and includes the following actions.

In action 101, link quality of a link over which data is to be transmitted is acquired.

In action 102, whether to transmit the data is determined according to the link quality of the link to over which the data is to be transmitted.

Specifically, the embodiment may include the following implementation scenarios.

Scenario 1

Figure 4:
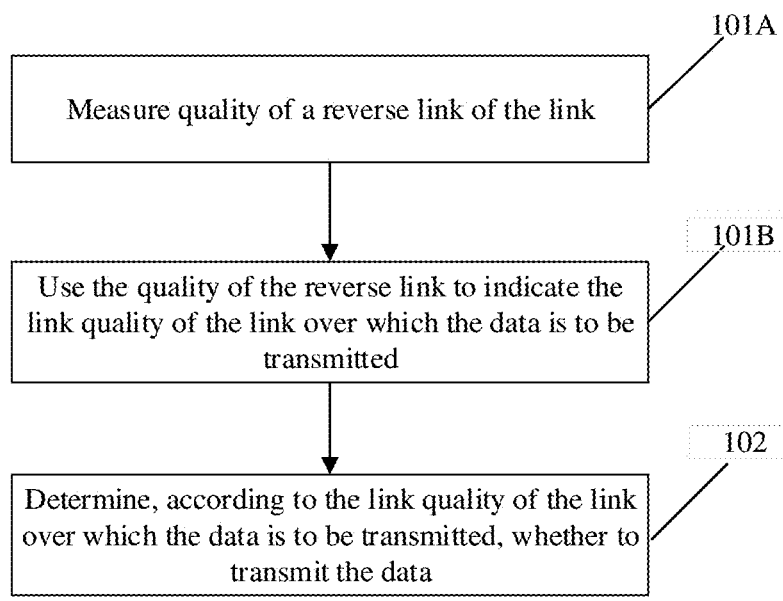
FIG. 4 illustrates a schematic flowchart of another method for controlling data transmission of a terminal device according to another embodiment of the disclosure.

In an implementation of the disclosure, as illustrated in FIG. 4, the action 101 that the link quality of the link over which the data is to be transmitted is acquired includes: 101A, quality of a reverse link of the link is measured, and 101B, the link quality of the link over which the data is to be transmitted is indicated with the quality of the reverse link.

The reverse link may be a downlink, or may be a link over which data is to be transmitted to the terminal device by another terminal. Correspondingly, the quality of the reverse link of the link may be measured in the way of: detecting quality of a signal received on the reverse link.

Figure 6:
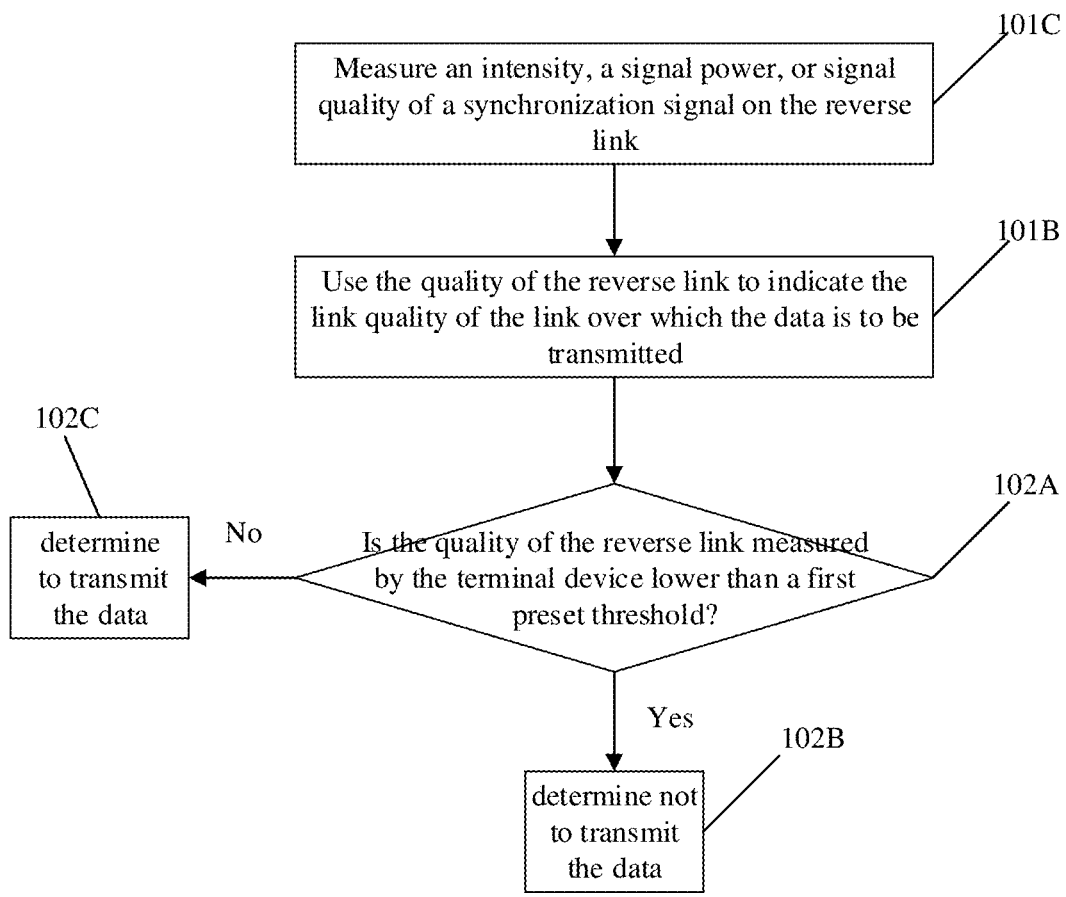
FIG. 6 illustrates a schematic flowchart of another method for controlling data transmission of a terminal device according to another embodiment of the disclosure.
Figure 7:
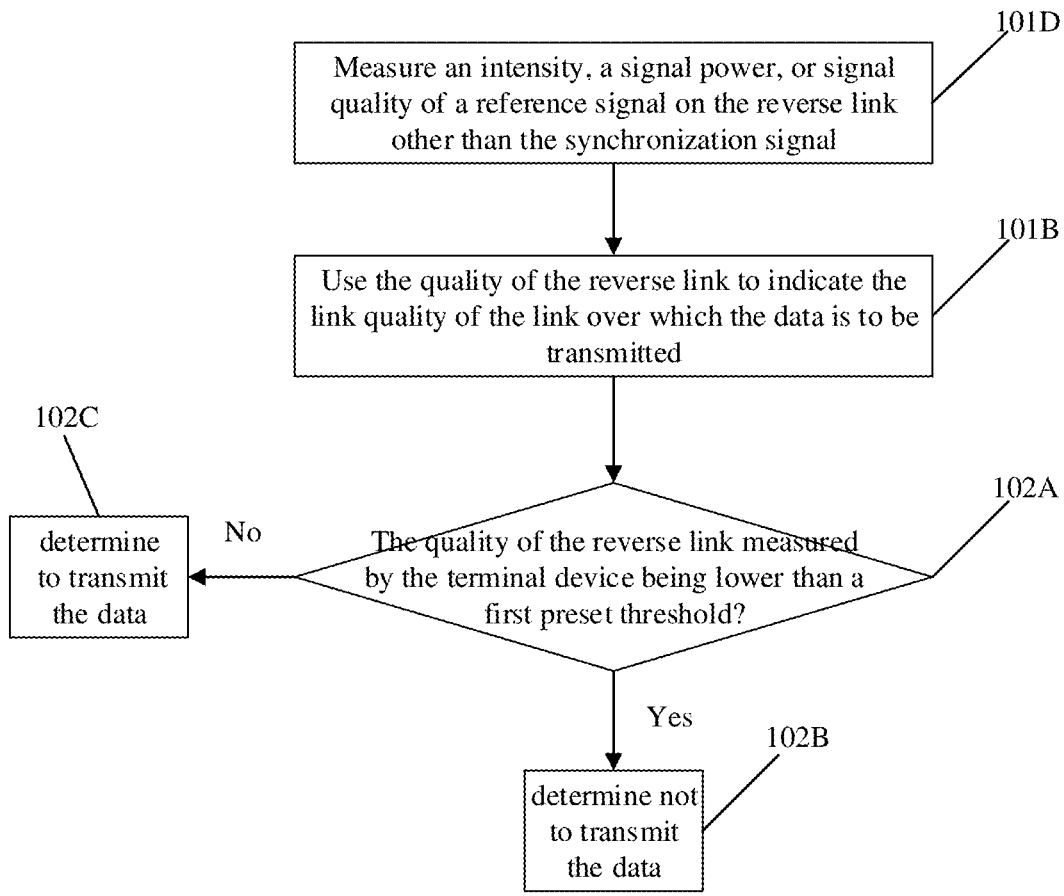
FIG. 7 illustrates a schematic flowchart of another method for controlling data transmission of a terminal device according to another embodiment of the disclosure.

In an implementation of the disclosure, as illustrated in FIGS. 6 and 7, the action 101A that the quality of the reverse link is measured includes: 101C, an intensity, a signal power, or signal quality of a synchronization signal on the reverse link is measured; or 101D, an intensity, a signal power, or a signal quality of a reference signal on the reverse link other than the synchronization signal on the reverse link is measured.

The reference signal may be reference signal receiving power (RSRP), a reference signal receiving quality (RSRQ) or a reference signal-signal to interference plus noise ratio (RS-SINR). The signal quality may be indicated by at least one of a signal-to-noise ratio, an interference value, or a power value. Of course, there may be more reference signals, and there may be more indexes to indicate the signal quality. Examples will not be given in an exhaustive manner.

Figure 5:
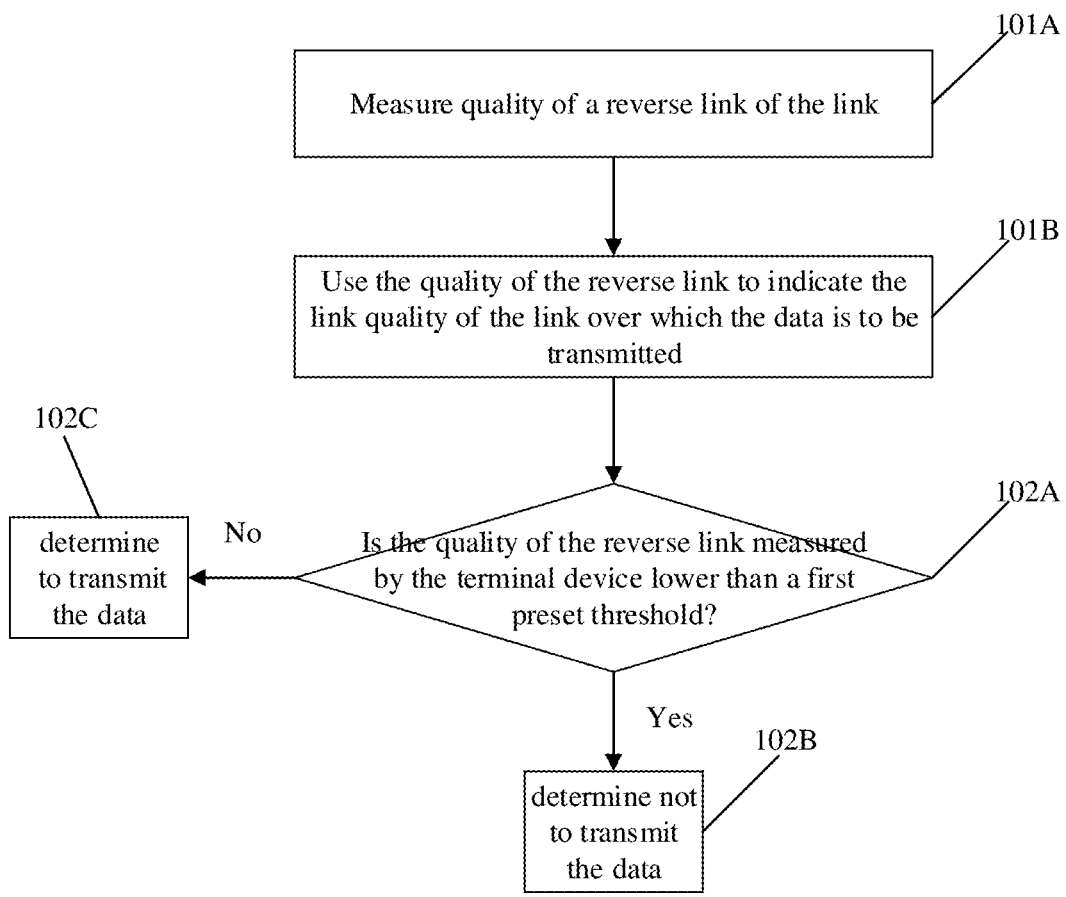
FIG. 5 illustrates a schematic flowchart of another method for controlling data transmission of a terminal device according to another embodiment of the disclosure.

In an implementation of the disclosure, as illustrated in FIGS. 5, 6 and 7, the operation 102 that whether to transmit the data is determined according to the link quality of the link over which the data is to be transmitted includes: 102A, whether the quality of the reverse link measured by the terminal device is lower than a first preset threshold is determined; and 102B in response to the quality of the reverse link measured by the terminal device being lower than a first preset threshold, it is determined not to transmit the data; or 102C in response to the quality of the reverse link fed back to the terminal device by a receiving end being no lower than the first preset threshold, it is determined to transmit the data.

The first preset threshold may be set according to an actual situation. The first preset threshold may be determined according to a present system load. For example, the first preset threshold may be set to be higher, when the current system load is larger.

In addition, the quality needs to be higher than the first preset threshold. When the quality is a signal-to-noise ratio or a power value, the corresponding first preset threshold may be used to confine data transmission in a link of which quality is lower than a signal-to-noise ratio threshold or a power threshold. Correspondingly, when the quality is indicated by an interference value, the first preset threshold may be an interference threshold, and correspondingly, the event that the quality is higher than the first preset threshold may be understood as that an interference value is lower than the interference threshold. In short, what needs to be confined by the first preset threshold is data transmission over a link of which quality is lower than the quality indicated by the first preset threshold.

Scenario 2

Figure 8:
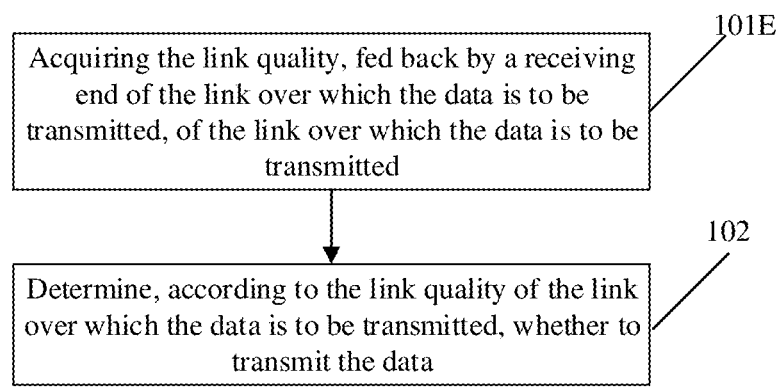
FIG. 8 illustrates a schematic flowchart of another method for controlling data transmission of a terminal device according to another embodiment of the disclosure.

In an implementation of the disclosure, as illustrated in FIG. 8, the action 101 that the link quality of the link over which the data is to be transmitted is acquired includes: 101E, the quality, which is fed back by a receiving end of the link over which the data is to be transmitted, of the link over which the data is to be transmitted is acquired.

The link over which the data is to be transmitted may be an uplink, or may be a link over which data is to be transmitted to another terminal.

Figure 9:
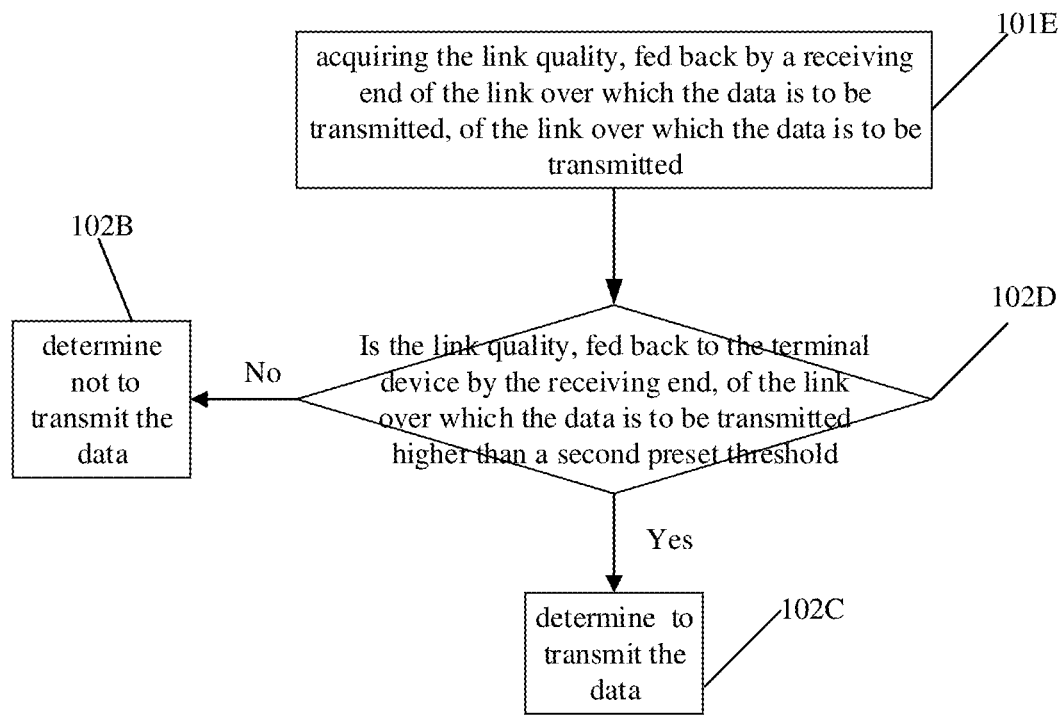
FIG. 9 illustrates a schematic flowchart of another method for controlling data transmission of a terminal device according to another embodiment of the disclosure.

In an implementation of the disclosure, as illustrated in FIG. 9, the action 102 that whether to transmit the data is determined according to the link quality of the link over which the data is to be transmitted includes: 102D, whether the link quality, fed back to the terminal device by the receiving end, of the link over which the data is to be transmitted higher than a second preset threshold is determined; and 102 B in response to the link quality, fed back to the terminal device by the receiving end, of the link over which the data is to be transmitted being no higher than a second preset threshold, it is determined not to transmit the data; or 102C in response to the link quality, fed back to the terminal device by the receiving end, of the link over which the data is to be transmitted being higher than the second preset threshold, it is determined to transmit the data.

The second preset threshold may be set according to an actual situation. The second preset threshold may be determined according to a present system load. For example, the second preset threshold may be set to be higher, when the current system load is larger.

In addition, the quality needs to be higher than the second preset threshold. When the quality is a signal-to-noise ratio or a power value, the corresponding second preset threshold may be used to confine data transmission in a link having quality lower than a signal-to-noise ratio threshold or a power threshold. Correspondingly, when the quality is indicated by an interference value, the second preset threshold may be an interference threshold, and correspondingly, the event that the quality is higher than the second preset threshold may be understood as that an interference value is lower than the interference threshold. In short, what needs to be confined by the second preset threshold is data transmission over a link of which quality is lower than the quality indicated by the second preset threshold.

Scenario 3

The link quality of the link over which the data is to be transmitted is indicated by a measured transmitting power of the terminal device.

The link over which the data is to be transmitted may be an uplink, or may be a link over which data is to be transmitted to another terminal.

An estimated link quality may be determined by predicting a power of data transmission. For example, when the predicted power of data transmission over the link is higher, it means that the estimated link quality is poor. Otherwise, it means that the estimated link quality is good.

Figure 10:
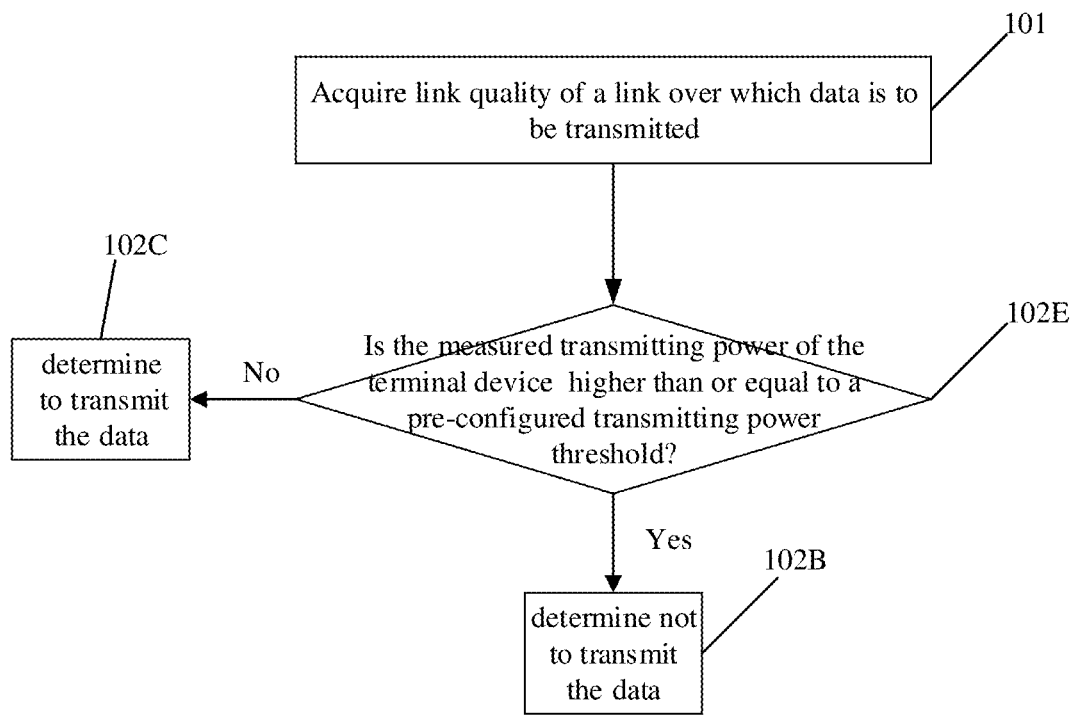
FIG. 10 illustrates a schematic flowchart of another method for controlling data transmission of a terminal device according to another embodiment of the disclosure.

In an implementation of the disclosure, as illustrated in FIG. 10, the action 102 that whether to transmit the data is determined according to the link quality of the link over which the data is to be transmitted includes: 102E, whether the measured transmitting power of the terminal device is higher than or equal to a pre-configured transmitting power threshold is determined; and 102B in response to the measured transmitting power of the terminal device being higher than or equal to a pre-configured transmitting power threshold, it is determined not to transmit the data; or 102 C in response to the measured transmitting power of the terminal device being lower than the pre-configured transmitting power threshold, it is determined to transmit the data.

The transmitting power threshold may be set according to an actual situation. The transmitting power threshold may be determined according to a present system load. For example, the transmitting power threshold may be set to be higher, when the current system load is larger.

In addition, if a transmitting power is higher than the transmitting power threshold, it may be considered that a higher transmitting power is required due to poor link quality. Then the terminal may be controlled not to transmit the data. Otherwise, the link quality is considered to be good, and it may be determined to transmit the data.

On the basis of the foregoing several scenarios, the embodiment further involves a method about how to control data transmission for different services.

Figure 11:
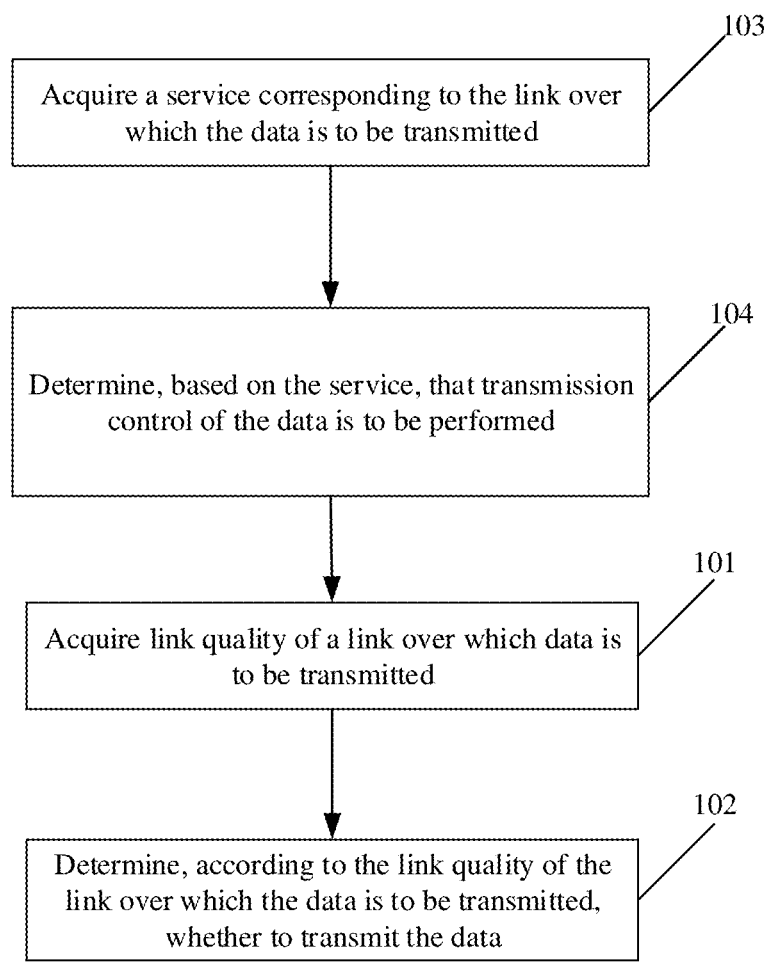
FIG. 11 illustrates a schematic flowchart of another method for controlling data transmission of a terminal device according to another embodiment of the disclosure.

In an implementation of the disclosure, as illustrated in FIG. 11, before the link quality of the link over which the data is to be transmitted is acquired at 101, the method further includes: 103, a service corresponding to the link over which the data is to be transmitted is acquired, and 104, whether to perform transmission control of the data is determined based on the service.

That is to say, whether to perform actions 101 and 102 of the embodiment may be determined according to the service. In particular, the determination may be made according to a type of the service, or according to a service identifier and a preset blacklist or whitelist of the terminal device itself. For example, the whitelist contains a service for which service data transmission does not need to be confined, and the blacklist contains a service for which service data transmission needs to be confined.

Figure 13:
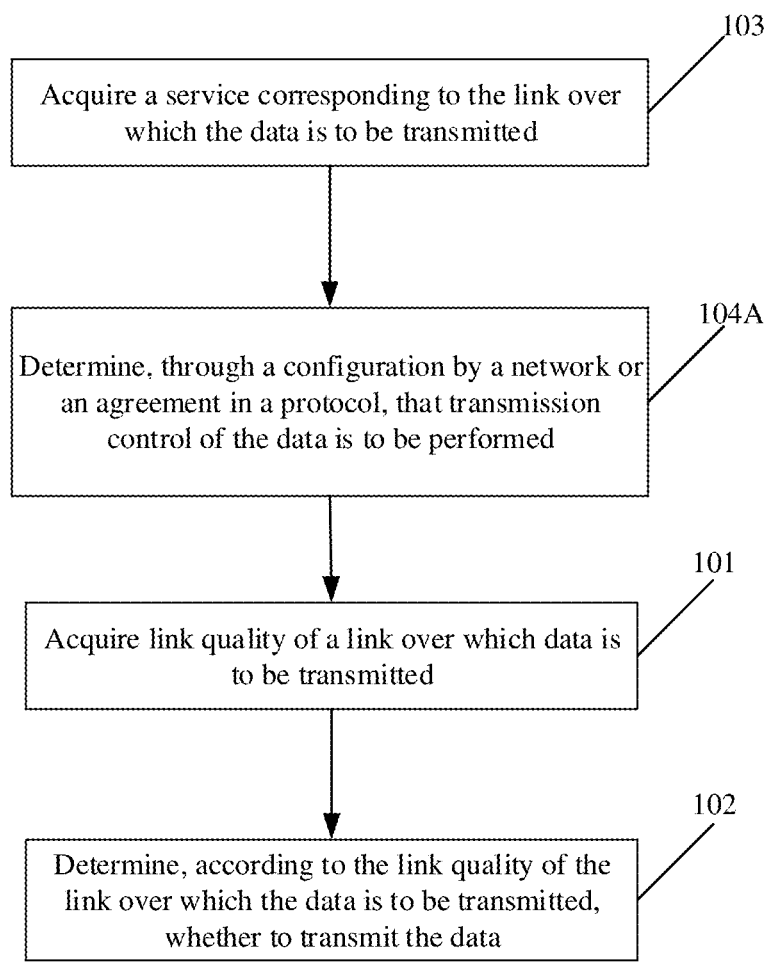
FIG. 13 illustrates a schematic flowchart of another method for controlling data transmission of a terminal device according to another embodiment of the disclosure.
Figure 14:
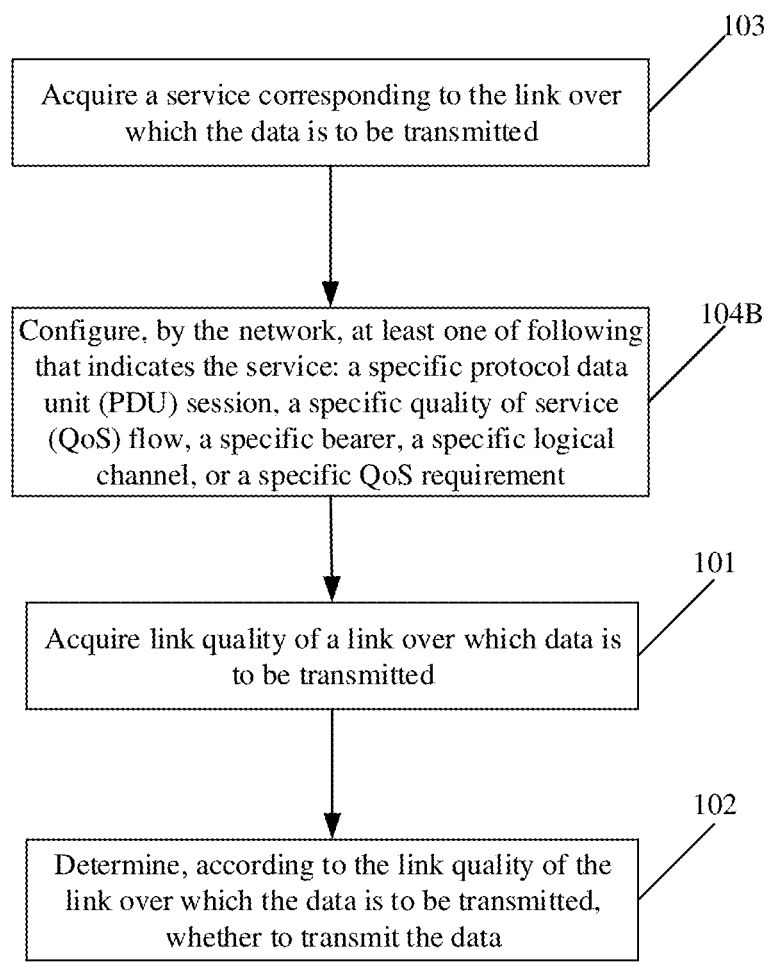
FIG. 14 illustrates a schematic flowchart of another method for controlling data transmission of a terminal device according to another embodiment of the disclosure.

Further, in an implementation of the disclosure, as illustrated in FIG. 13, the action 104 that whether to whether to perform transmission control of the data is determined based on the service includes: 104A, whether to perform transmission control of the data for the service is determined through a configuration by a network or an agreement in a protocol.

Specifically, in an implementation of the disclosure, as illustrated in FIG. 13, the action 104A that whether to perform transmission control of the data for the service is determined through the configuration by the network or the agreement in the protocol includes: 104B, transmission control of the data for the service is performed by configuring, by the network, at least one of: a specific protocol data unit (PDU) session, a specific quality of service (QoS) flow, a specific bearer, a specific logical channel, or a specific QoS requirement.

The service is indicated by at least one of: the specific PDU session, the specific QoS flow, the specific bearer, the specific logical channel, or the specific QoS requirement. In other words, a service may be represented by at least one of the above features, and a service with any one of the features being different may be considered as a different service.

Figure 12:
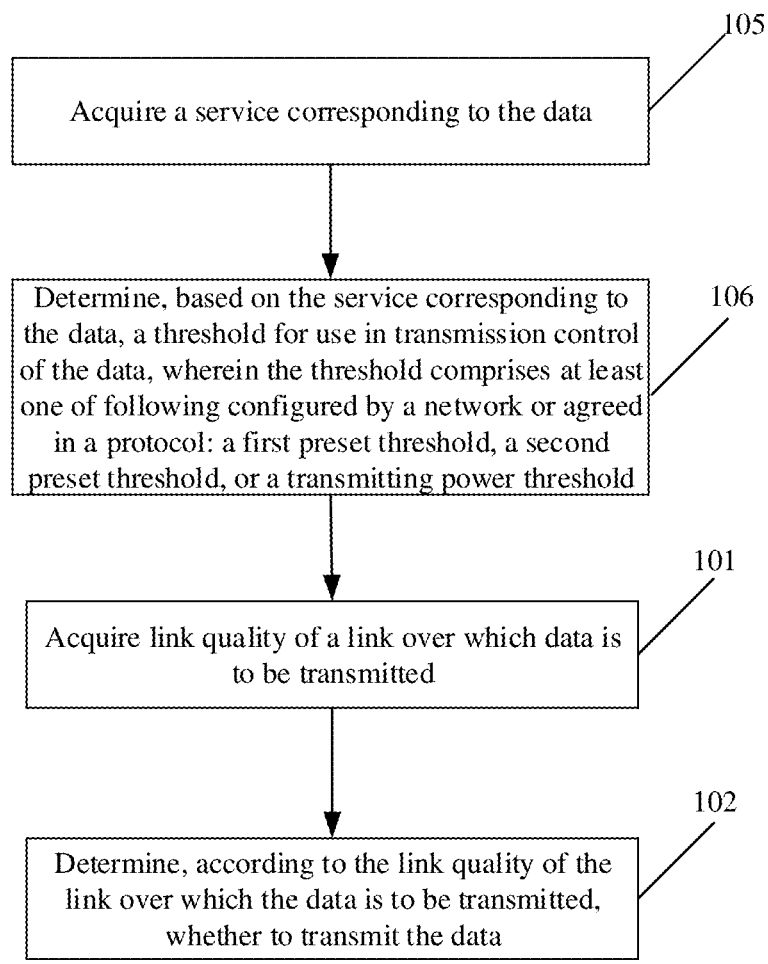
FIG. 12 illustrates a schematic flowchart of another method for controlling data transmission of a terminal device according to another embodiment of the disclosure.

In an implementation of the disclosure, as illustrated in FIG. 12, before the link quality of the link over which the data is to be transmitted is acquired at 101, the method further includes: 105, a service corresponding to the data is acquired; and 106, a threshold for use in transmission control of the data is determined based on the service corresponding to the data.

The threshold includes at least one of: a first preset threshold, a second preset threshold, or a transmitting power threshold. The first preset threshold, the second preset threshold and the transmitting power threshold are configured by a network or agreed in a protocol.

It should be understood that different services may correspond to the same or different thresholds. For example, the terminal supports services 1, 2, and 3. A same threshold may be used for the services 1 and 2, and a threshold different from the threshold corresponding to the services 1 and 2 may be used for the service 3. Which threshold is used for which specific service can be set according to actual conditions, and will not be described here.

Still further, the link over which the data is to be transmitted in the embodiment may be an uplink or a bypass link. It may also be a downlink, which is not limited in the present embodiment.

Figure 15:
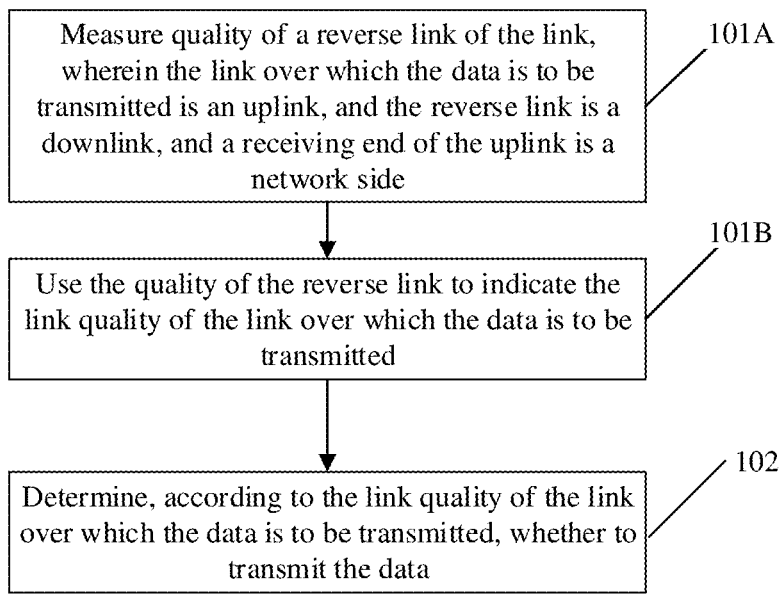
FIG. 15 illustrates a schematic flowchart of another method for controlling data transmission of a terminal device according to another embodiment of the disclosure.

In an implementation of the disclosure, as illustrated in FIG. 15, when the link over which the data is to be transmitted is an uplink, the reverse link is a downlink, and a receiving end of the uplink is a network side.

Figure 16:
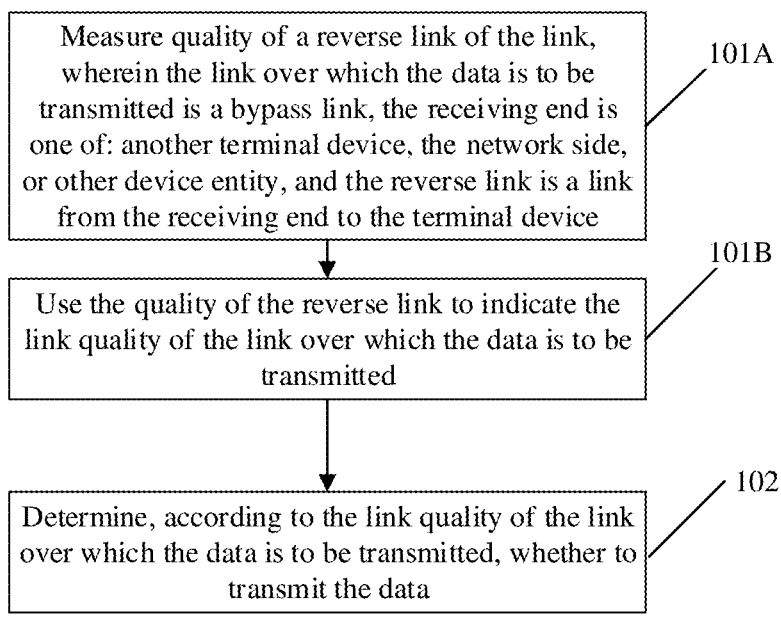
FIG. 16 illustrates a schematic flowchart of another method for controlling data transmission of a terminal device according to another embodiment of the disclosure.

Alternatively, in an implementation of the disclosure, as illustrated in FIG. 16, when the link over which the data is to be transmitted is a bypass link, the receiving end is one of: another terminal device, a network side, or another device entity, and the reverse link is a link from the receiving end to the terminal device.

Finally, it should be noted that the services in the embodiment may include all services, or may include delay-insensitive services.

It can be seen that by means of the above solution, when having data to transmit, a terminal may determine whether to transmit the data according to link quality of a link over which the data is to be transmitted. In this way, the conditions of data transmission can be correlated with the conditions of the link over which the data is to be transmitted, and the terminal may be controlled not to transmit the data. Thus, the problem of serious power consumption of a terminal device caused by data transmission with a larger power under non-ideal link conditions is avoided.

Embodiment 2

Figure 2:
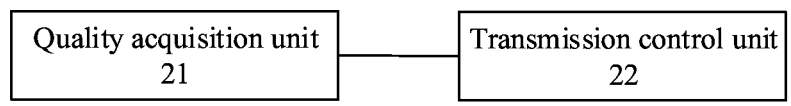
FIG. 2 illustrates a schematic structural diagram of composition of a terminal device according to an embodiment of the disclosure.

In embodiment of the disclosure, a terminal device is provided. As illustrated in FIG. 2, the terminal device includes: a quality acquisition unit 21 and a transmission control unit 22.

The quality acquisition unit 21 is configured to acquire link quality of a link over which data is to be transmitted.

The transmission control unit 22 is configured to determine, according to the link quality of the link over which the data is to be transmitted, whether to transmit the data.

Specifically, the embodiment may include the following implementation scenarios.

Scenario 1

The quality acquisition unit 21 is configured to: measure quality of a reverse link of the link, and use the quality of the reverse link to indicate the link quality of the link over which the data is to be transmitted.

The reverse link may be a downlink, or may be a link over which data is to be transmitted to the terminal device by another terminal. Correspondingly, the quality of the reverse link of the link may be measured in the way of: detecting quality of a signal received on the reverse link.

The quality acquisition unit 21 is configured to measure an intensity, a signal power, or signal quality of a synchronization signal on the reverse link; or measure an intensity, a signal power, or signal quality of a reference signal on the reverse link other than the synchronization signal.

The reference signal may be reference signal receiving power (RSRP), a reference signal receiving quality (RSRQ) or a reference signal-signal to interference plus noise ratio (RS-SINR). The signal quality may be indicated by at least one of a signal-to-noise ratio, an interference value, or a power value. Of course, there may be more reference signals, and there may be more indexes to indicate the signal quality. Examples will not be given in an exhaustive manner.

The transmission control unit 22 is configured to: in response to the quality of the reverse link measured by the terminal device being lower than a first preset threshold, determine not to transmit the data; or in response to the quality of the reverse link fed back to the terminal device by a receiving end being no lower than the first preset threshold, determine to transmit the data.

The first preset threshold may be set according to an actual situation. The first preset threshold may be determined according to a present system load. For example, the first preset threshold may be set to be higher, when the current system load is larger.

In addition, the quality needs to be higher than the first preset threshold. When the quality is a signal-to-noise ratio or a power value, the corresponding first preset threshold may be used to confine data transmission in a link of which quality is lower than a signal-to-noise ratio threshold or a power threshold. Correspondingly, when the quality is indicated by an interference value, the first preset threshold may be an interference threshold, and correspondingly, the event that the quality is higher than the first preset threshold may be understood as that an interference value is lower than the interference threshold. In short, what needs to be confined by the first preset threshold is data transmission over a link of which quality is lower than the quality indicated by the first preset threshold.

Scenario 2

The quality acquisition unit 21 is configured to acquire the quality, which is fed back by a receiving end of the link over which the data is to be transmitted, of the link over which the data is to be transmitted.

The link over which the data is to be transmitted may be an uplink, or may be a link over which data is to be transmitted to another terminal.

The transmission control unit 22 is configured to: in response to the link quality, fed back to the terminal device by the receiving end, of the link over which the data is to be transmitted being no higher than a second preset threshold, it is determine not to transmit the data; or in response to the link quality, fed back to the terminal device by the receiving end, of the link over which the data is to be transmitted being higher than the second preset threshold, it is determine to transmit the data.

The second preset threshold may be set according to an actual situation. The second preset threshold may be determined according to a present system load. For example, the second preset threshold may be set to be higher, when the current system load is larger.

In addition, the quality needs to be higher than the second preset threshold. When the quality is a signal-to-noise ratio or a power value, the corresponding second preset threshold may be used to confine data transmission in a link having quality lower than a signal-to-noise ratio threshold or a power threshold. Correspondingly, when the quality is indicated by an interference value, the second preset threshold may be an interference threshold, and correspondingly, the event that the quality is higher than the second preset threshold may be understood as that an interference value is lower than the interference threshold. In short, what needs to be confined by the second preset threshold is data transmission over a link of which quality is lower than the quality indicated by the second preset threshold.

Scenario 3

The link quality of the link over which the data is to be transmitted is indicated by a measured transmitting power of the terminal device.

The link over which the data is to be transmitted may be an uplink, or may be a link over which data is to be transmitted to another terminal.

An estimated link quality may be determined by predicting a power of data transmission. For example, when the predicted power of data transmission over the link is higher, it means that the estimated link quality is poor. Otherwise, it means that the estimated link quality is good The transmission control unit 22 is configured to: in response to the measured transmitting power of the terminal device being higher than or equal to a pre-configured transmitting power threshold, determine not to transmit the data; or in response to the measured transmitting power of the terminal device being lower than the pre-configured transmitting power threshold, determine to transmit the data.

The transmitting power threshold may be set according to an actual situation. The transmitting power threshold may be determined according to a present system load. For example, the transmitting power threshold may be set to be higher, when the current system load is larger.

In addition, if a transmitting power is higher than the transmitting power threshold, it may be considered that a higher transmitting power is required due to poor link quality. Then the terminal may be controlled not to transmit the data. Otherwise, the link quality is considered to be good, and it may be determined to transmit the data.

On the basis of the foregoing several scenarios, the embodiment further involves a method about how to control data transmission for different services.

The transmission control unit 22 is configured to, before the link quality of the link over which the data is to be transmitted is acquired: acquire a service corresponding to the link over which the data is to be transmitted, and determine, based on the service, whether to perform transmission control of the data.

That is to say, whether to perform functions of the embodiment may be determined according to the service. In particular, the determination may be made according to a type of the service, or according to a service identifier and a preset blacklist or whitelist of the terminal device itself. For example, the whitelist contains a service for which service data transmission does not need to be confined, and the blacklist contains a service for which service data transmission needs to be confined.

Further, the transmission control unit 22 is configured to: determine, through a configuration by a network or an agreement in a protocol, whether to perform transmission control of the data for the service.

Specifically, the action that whether to perform transmission control of the data for the service is determined through the configuration by the network or the agreement in the protocol includes: transmission control of the data for the service is performed by configuring, by the network, at least one of: a specific protocol data unit (PDU) session, a specific quality of service (QoS) flow, a specific bearer, a specific logical channel, or a specific QoS requirement The service is indicated by at least one of: the specific PDU session, the specific QoS flow, the specific bearer, the specific logical channel, or the specific QoS requirement. In other words, a service may be represented by at least one of the above features, and a service with any one of the features being different may be considered as a different service.

The transmission control unit 22 is configured to: acquire a service corresponding to the data; and determine, based on the service corresponding to the data, a threshold for use in transmission control of the data.

The threshold includes at least one of: a first preset threshold, a second preset threshold, or a transmitting power threshold. The first preset threshold, the second preset threshold and the transmitting power threshold are configured by a network or agreed in a protocol.

It should be understood that different services may correspond to the same or different thresholds. For example, the terminal supports services 1, 2, and 3. A same threshold may be used for the services 1 and 2, and a threshold different from the threshold corresponding to the services 1 and 2 may be used for the service 3. Which threshold is used for which specific service can be set according to actual conditions, and will not be described here.

Still further, the link over which the data is to be transmitted in the embodiment may be an uplink or a bypass link. This is not limited in the present embodiment.

When the link over which the data is to be transmitted is an uplink, the reverse link is a downlink, and a receiving end of the uplink is a network side.

Alternatively, when the link over which the data is to be transmitted is a bypass link, the receiving end is one of: another terminal device, a network side, or another device entity, and the reverse link is a link from the receiving end to the terminal device.

Finally, it should be noted that the services in the embodiment may include all services, or may include delay-insensitive services.

It can be seen that by means of the above solution, when having data to transmit, a terminal may determine whether to transmit the data according to link quality of a link over which the data is to be transmitted. In this way, the conditions of data transmission can be correlated with the conditions of the link over which the data is to be transmitted, and the terminal may be controlled not to transmit the data. Thus, the problem of serious power consumption of a terminal device caused by data transmission with a larger power under non-ideal link conditions is avoided.

Figure 3:
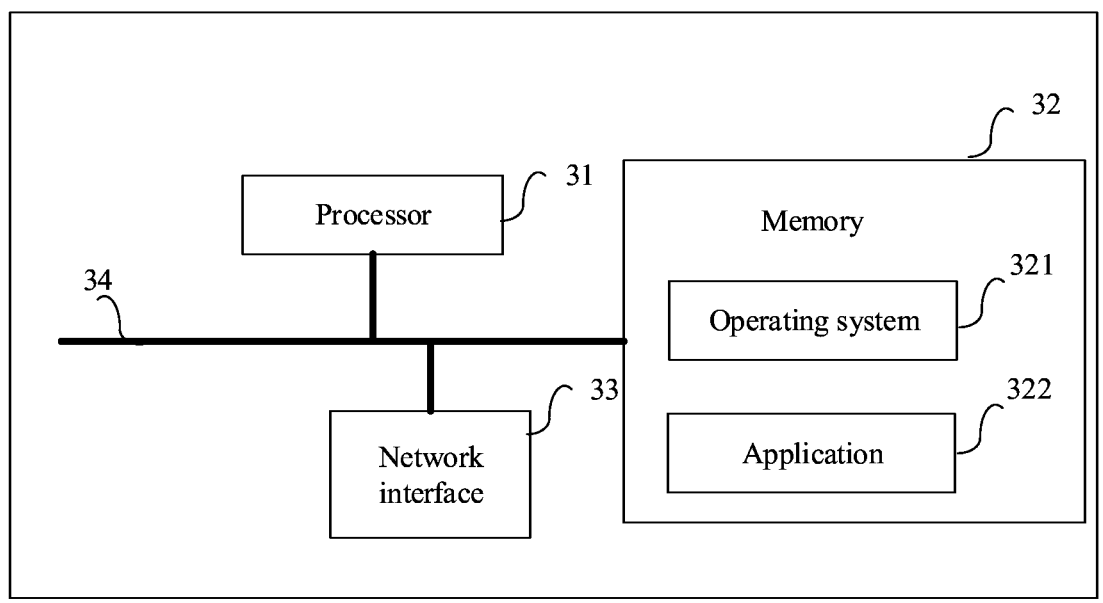
FIG. 3 illustrates a schematic diagram of a hardware architecture according to an embodiment of the disclosure.

In embodiments of the disclosure, also provided is a hardware composition architecture of a terminal device. As shown in FIG. 3, the terminal device includes: at least one processor 31, a memory 32, and at least one network interface 33. The various components are coupled together through a bus system 34. It can be understood that the bus system 34 is configured to implement connection communication among these components. The bus system 34 may further include, in addition to a data bus, a power bus, a control bus, and a status signal bus. However, for clarity of description, all buses are labeled as the bus system 34 in FIG. 3.

It is to be understood that the memory 32 in the embodiments of the disclosure may be a volatile memory or a non-volatile memory, or may include both a volatile memory and a non-volatile memory.

In some implementations, the memory 32 stores the following elements of an operating system 321 and applications 322: executable modules or data structures, or subsets thereof, or extended sets thereof.

The processor 31 is configured to be able to perform the method steps of the foregoing embodiment 1, which will not be repeated here.

A computer storage medium provided in embodiments of the disclosure stores computer-executable instructions which, when executed, implement the method steps of the foregoing embodiment 1.

If being implemented in the form of a software functional module and sold or used as a standalone product, the apparatus of the embodiments of the disclosure may be stored in a computer-readable storage medium. Based on such understanding, the technical solution of the embodiments of the disclosure in essence or in a part contributing to the related art may be embodied in the form of a software product. The software product is stored in a storage medium, including a plurality of instructions used to cause a computer device (which may be a personal computer, server, or network device, etc.) to perform all or part of the methods described in various embodiments of the disclosure. The foregoing storage medium includes: a USB flash disk, a mobile hard disk, a Read Only Memory (ROM), a magnetic disk, or an optical disk, and the like, which may store program codes. Thus, the embodiments of the disclosure are not limited to any specific combination of hardware and software.

Correspondingly, an embodiment of the disclosure also provides a computer storage medium, which stores a computer program that is configured to perform the data scheduling method according to the embodiment of the disclosure.

Although the preferred embodiments of the disclosure have been disclosed for illustrative purposes, those skilled in the art will realize that various improvements, additions, and substitutions are also possible. Therefore, the scope of the disclosure should not be limited to the above embodiments.

The invention claimed is:

1. A method for controlling data transmission of a terminal device, applied to the terminal device, and comprising:
   acquiring a service corresponding to a link over which data is to be transmitted,
   determining, based on the service, whether to perform transmission control of the data;
   in response to determining to perform transmission control of the data, acquiring link quality of the link over which the data is to be transmitted; and
   determining, according to the link quality of the link over which the data is to be transmitted, whether to transmit the data;
   wherein acquiring the link quality of the link over which the data is to be transmitted comprises:
      acquiring the link quality, fed back by a receiving end of the link over which the data is to be transmitted, of the link over which the data is to be transmitted;
   wherein determining, according to the link quality of the link over which the data is to be transmitted, whether to transmit the data comprises:
      in response to the link quality, fed back to the terminal device by the receiving end, of the link over which the data is to be transmitted being no higher than a second preset threshold, determining not to transmit the data; or in response to the link quality, fed back to the terminal device by the receiving end, of the link over which the data is to be transmitted being higher than the second preset threshold, determining to transmit the data; and
   wherein determining, based on the service, whether to perform transmission control of the data comprises:
      determining, through a configuration by a network, whether to perform transmission control of the data for the service, wherein the configuration comprises configuration of a specific protocol data unit (PDU) session or a specific quality of service (QoS) flow.

2. The method according to claim 1, wherein acquiring the link quality of the link over which the data is to be transmitted comprises:
measuring quality of a reverse link of the link, and
using the quality of the reverse link to indicate the link quality of the link over which the data is to be transmitted.

3. The method according to claim 2, wherein determining, according to the link quality of the link over which the data is to be transmitted, whether to transmit the data comprises:
in response to the quality of the reverse link measured by the terminal device being lower than a first preset threshold, determining not to transmit the data; or
in response to the quality of the reverse link measured by the terminal device being no lower than the first preset threshold, determining to transmit the data.

4. The method according to claim 3, wherein measuring the quality of the reverse link comprises:
measuring an intensity, a signal power, or signal quality of a synchronization signal on the reverse link; or
measuring an intensity, a signal power, or signal quality of a reference signal on the reverse link other than the synchronization signal.

5. The method according to claim 1, wherein before acquiring the link quality of the link over which the data is to be transmitted, the method further comprises:
acquiring a service corresponding to the data; and
determining, based on the service corresponding to the data, a threshold for use in transmission control of the data, wherein the threshold comprises at least one of: a first preset threshold or the second preset threshold.

6. The method according to claim 1, wherein the service is indicated by at least one of: the specific PDU session, the specific QoS flow, the specific bearer, the specific logical channel, or the specific QoS requirement.

7. The method according to claim 1, wherein
in response to the link over which the data is to be transmitted being an uplink, the reverse link is a downlink, and a receiving end of the uplink is a network side; or
in response to the link over which the data is to be transmitted being a bypass link, the receiving end is one of: another terminal device, the network side, or other device entity, and the reverse link is a link from the receiving end to the terminal device.

8. The method according to claim 5, wherein the first preset threshold and the second preset threshold are configured by a network or agreed in a protocol.

9. A terminal device, comprising a processor, and a memory for storing a computer program, wherein the processor, when running the computer program, is configured to:
acquire a service corresponding to a link over which data is to be transmitted,
determine, based on the service, whether to perform transmission control of the data;
in response to determining to perform transmission control of the data, acquire link quality of the link over which the data is to be transmitted; and
determine, according to the link quality of the link over which the data is to be transmitted, whether to transmit the data;
wherein, in acquiring the link quality of the link over which the data is to be transmitted, the processor is configured to:
acquire the link quality, fed back by a receiving end of the link over which the data is to be transmitted, of the link over which the data is to be transmitted;
wherein, in determining, according to the link quality of the link over which the data is to be transmitted, whether to transmit the data, the processor is configured to:
in response to the link quality, fed back to the terminal device by the receiving end, of the link over which the data is to be transmitted being no higher than a second preset threshold, determine not to transmit the data; or in response to the link quality, fed back to the terminal device by the receiving end, of the link over which the data is to be transmitted being higher than the second preset threshold, determine to transmit the data; and
wherein in determining, based on the service, whether to perform transmission control of the data, the processor is configured to:
determine, through a configuration by a network, whether to perform transmission control of the data for the service, wherein the configuration comprises configuration of a specific protocol data unit (PDU) session or a specific quality of service (QoS) flow.

10. The terminal device according to claim 9, wherein, in acquiring the link quality of the link over which the data is to be transmitted, the processor is configured to:
measure quality of a reverse link of the link, and
use the quality of the reverse link to indicate the link quality of the link over which the data is to be transmitted.

11. The terminal device according to claim 10, wherein, in determining, according to the link quality of the link over which the data is to be transmitted, whether to transmit the data, the processor is configured to:
in response to the quality of the reverse link measured by the terminal device being lower than a first preset threshold, determine not to transmit the data; or
in response to the quality of the reverse link measured by being no lower than the first preset threshold, determine to transmit the data.

12. The terminal device according to claim 11, wherein, in measuring the quality of the reverse link, the processor is configured to:
measure an intensity, a signal power, or signal quality of a synchronization signal on the reverse link; or
measure an intensity, a signal power, or signal quality of a reference signal on the reverse link other than the synchronization signal.

13. The terminal device according to claim 9, wherein, before acquiring the link quality of the link over which the data is to be transmitted, the processor is configured to:
acquire a service corresponding to the data; and
determine, based on the service corresponding to the data, a threshold for use in transmission control of the data, wherein the threshold comprises at least one of: a first preset threshold or the second preset threshold.

14. The terminal device according to claim 1, wherein the service is indicated by at least one of: the specific PDU session, the specific QoS flow, the specific bearer, the specific logical channel, or the specific QoS requirement.

15. The terminal device according to claim 9, wherein
in response to the link over which the data is to be transmitted being an uplink, the reverse link is a downlink, and a receiving end of the uplink is a network side; or in response to the link over which the data is to be transmitted being a bypass link, the receiving end is one of: another terminal device, the network side, or other device entity, and the reverse link is a link from the receiving end to the terminal device.

16. The terminal device according to claim 13, wherein the first preset threshold and the second preset threshold are configured by a network or agreed in a protocol.

* * * * *